A. F. KRAMER.
TIRE.
APPLICATION FILED JUNE 7, 1910.

1,003,363.

Patented Sept. 12, 1911.

2 SHEETS—SHEET 1.

WITNESSES
Samuel Payne

INVENTOR
A. F. Kramer
by
Attorneys.

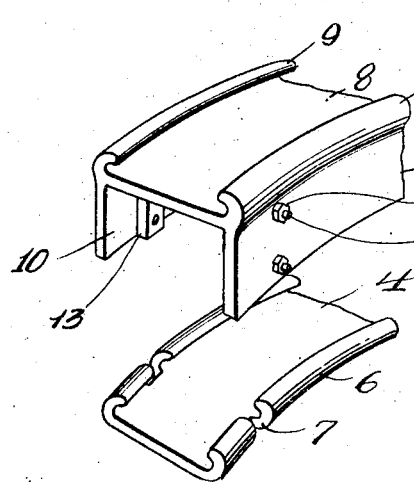
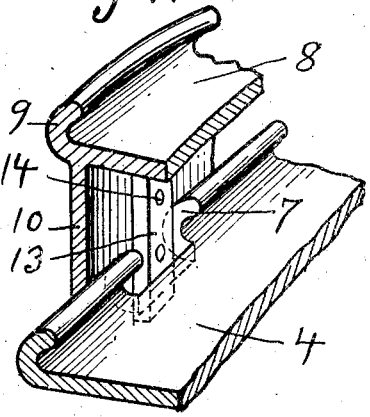
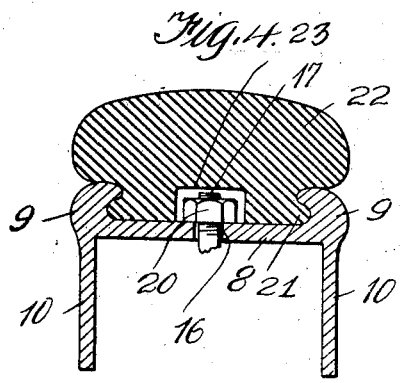
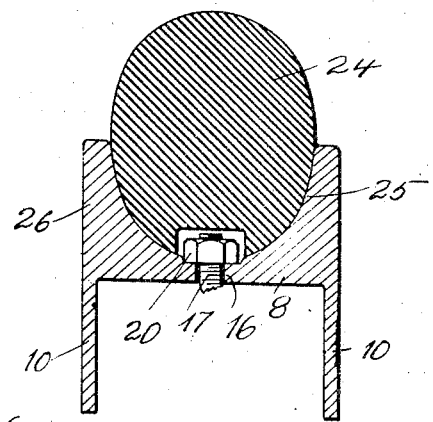
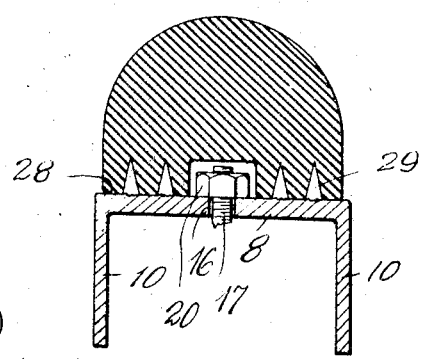

UNITED STATES PATENT OFFICE.

ALFRED F. KRAMER, OF FREEDOM, PENNSYLVANIA.

TIRE.

1,003,363.  Specification of Letters Patent. Patented Sept. 12, 1911.

Application filed June 7, 1910. Serial No. 565,515.

*To all whom it may concern:*

Be it known that I, ALFRED F. KRAMER, a citizen of the United States of America, residing at Freedom, in the county of Beaver and State of Pennsylvania, have invented certain new and useful Improvements in Tires, of which the following is a specification, reference being had therein to the accompanying drawing.

This invention relates to tires and more particularly to that type of tire used in connection with automobiles and similar vehicles.

The objects of my invention are to dispense with the use of pneumatic tires and provide a solid rubber tire with novel means for cushioning the same upon the felly or rim of a wheel, and to provide a dust-proof, non-penetrable tire that can be readily used in connection with the present type of automobile wheel.

Further objects of the invention are to utilize springs in connection with a wheel for cushioning a solid tire, the springs being arranged whereby they will coöperate in sustaining a load upon the axle of a wheel, and to accomplish the above results by a mechanical construction that is simple, durable, easy to repair and efficient for the purposes for which it is intended.

With these and such other objects as may hereinafter appear, the invention consists of the novel construction, combination and arrangement of parts to be hereinafter specifically described and then claimed.

Reference will now be had to the drawings forming a part of this specification, wherein there are illustrated the preferred embodiments of the invention, but it is to be understood that the structural elements thereof can be varied or changed without departing from the spirit and scope of the invention.

Figure 1:
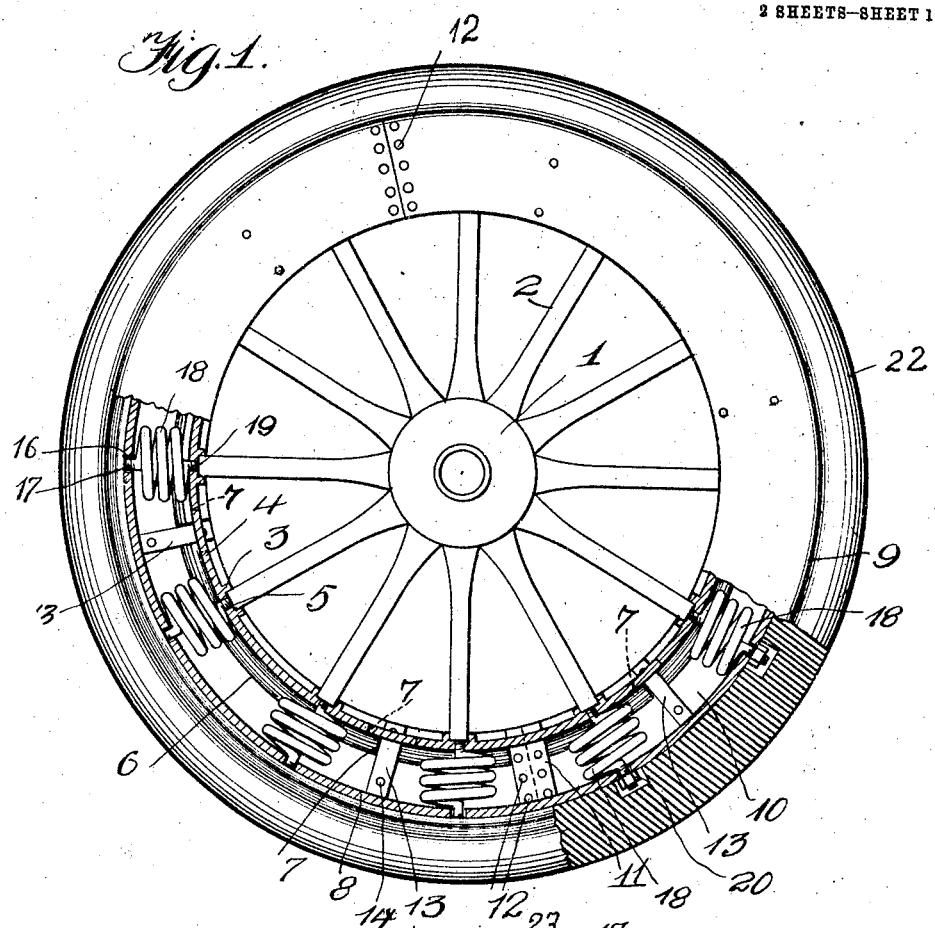
Figure 2:
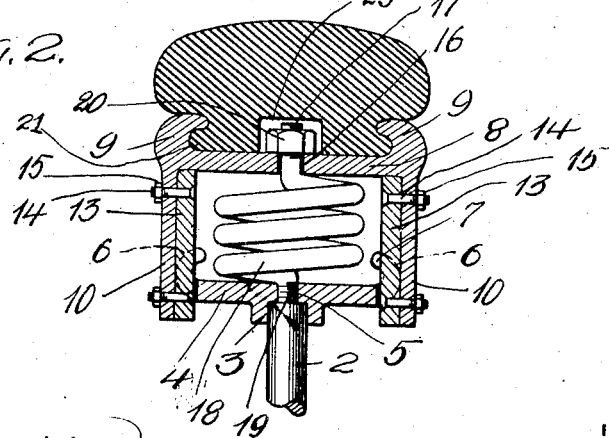

In the drawings:—Figure 1 is a side elevation of a wheel in accordance with this invention, partly broken away and partly in section, Fig. 2 is a cross sectional view of a portion of the wheel, Fig. 3 is a perspective view of a portion of the felly and rim of the wheel, Fig. 4 is an enlarged cross sectional view of a portion of the wheel, Fig. 5 is a similar view of a modified form of wheel, and Fig. 6 is a similar view of another modified form of wheel.

In the accompanying drawings the reference numeral 1 denotes a hub having a plurality of radially disposed spokes 2 mounted in the inwardly projecting sockets 3 of a channel shaped felly 4, said felly being arranged circumferentially of the spokes and opposite each socket thereof provided with an opening 5 having the walls thereof threaded. The channel shaped felly 4 has the side flanges 6 thereof provided with a plurality of oppositely disposed vertical grooves 7, the purpose of which will presently appear.

8 denotes a rim of a greater diameter than the felly 4, said rim having the edges thereof provided with hook-shaped flanges 9 and inwardly projecting flanges 10, said flanges being arranged in parallelism to engage the outer edges of the flanges 6 of the felly 4. The rim 8 is made of a single piece of metal rolled to the desired shape and the ends thereof connected by plates 11 and rivets 12, said plates being arranged upon the inner sides of the flanges 10. The inner sides of the flanges 10 are provided with a plurality of radially disposed guide bars 13 retained in engagement with the flanges by bolts 14 and nuts 15, or other fastening means. These guide bars are adapted to engage in the grooves 7 of the felly 4 and guide the movement of the rim 8 relatively to said felly. The rim is provided with a plurality of equally spaced openings 16 and extending through these openings are the threaded ends 17 of coiled compression springs 18, said springs having the opposite ends 19 thereof mounted in the openings 5. The threaded ends 17 of the springs extend through the openings 16 and are provided with nuts 20, thus permitting the parts of the tire being easily and quickly assembled.

The flanges 9 of the rim 8 serve functionally as a clencher for holding the circumferentially and beaded edges 21 of a resilient tire 22, said tire being preferably made of rubber with the inner side thereof cut away to form recesses 23, these recesses providing clearance for the nuts 20 and the threaded ends 17 of the springs 18.

In Figs. 5 and 6 of the drawings there are illustrated modifications of the manner of attaching the tire to the rim, for instance in Fig. 5, the tire 24, oval-shaped in cross section is mounted in a circumferentially arranged groove 25 formed in an enlargement 26 of the rim 8, while in Fig. 6 of the drawings the flanges 9 and the enlargement 26 are dispensed with and the outer side of the rim 8 provided with a plurality of pins or bearings 27 adapted to engage in the flat side 28 of a tire that is substantially semi-circular in cross section.

From the foregoing it will be observed that the rim of the wheel is yieldably and resiliently connected to the felly of a wheel, consequently the rim can shift, but the shifting movement thereof is limited by the compression springs 18 which are so disposed as to equalize the pressure on all parts of the tire 22 when pressure is brought to bear upon the hub 1.

The hub 1, spokes 2 and felly 4 are of the conventional form at present used, and to install my improved tire it is only necessary to provide the felly with the grooves 7. The felly 4, rim 8, springs 18 and the remaining parts of the structure, with the exception of the tire 22 are made of strong and durable metal and it is immaterial as to the type of fastener employed for retaining the tire 22 upon the rim 8.

Having now described my invention what I claim as new, is:—

A tire for wheels comprising a felly having its sides formed with grooves and further provided centrally thereof with a circumferentially extending row of openings having threaded walls, a rim having inwardly projecting flanges engaging the sides of said felly and further provided with a centrally disposed circumferentially extending row of openings, a tread carried by said rim, coiled compression springs interposed between said rim and felly and having their inner ends threaded for engagement with the threads of the walls of the openings of the felly and their outer ends loosely extending through the openings of the rim, nuts carried by the ends of the springs which extend through the rim whereby the springs are loosely connected with the rim, and bars carried by the inner side of the flange of the rim and slidable through the grooves of the felly.

In testimony whereof I affix my signature in the presence of two witnesses.

ALFRED F. KRAMER.

Witnesses:
JOSEPH J. BUSER,
ARTHUR H. RIDER.